United States Patent
McCorkendale et al.

(10) Patent No.: US 8,060,940 B2
(45) Date of Patent: Nov. 15, 2011

(54) SYSTEMS AND METHODS FOR CONTROLLING ACCESS TO DATA THROUGH APPLICATION VIRTUALIZATION LAYERS

(75) Inventors: Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 686 days.

(21) Appl. No.: 12/147,700

(22) Filed: Jun. 27, 2008

(65) Prior Publication Data

US 2010/0064340 A1    Mar. 11, 2010

(51) Int. Cl.
*G06F 7/04* (2006.01)
(52) U.S. Cl. ............. 726/26; 726/1; 726/2; 726/27
(58) Field of Classification Search ............ 726/1, 15, 726/26, 27, 2
See application file for complete search history.

(56) References Cited

U.S. PATENT DOCUMENTS

| | | | |
|---|---|---|---|
| 7,636,442 B2 * | 12/2009 | Scarlata et al. | 380/283 |
| 2005/0055578 A1 | 3/2005 | Wright et al. | |
| 2006/0020781 A1 * | 1/2006 | Scarlata et al. | 713/100 |
| 2006/0161982 A1 | 7/2006 | Chari et al. | |
| 2007/0300069 A1 * | 12/2007 | Rozas | 713/176 |
| 2009/0249330 A1 * | 10/2009 | Abercrombie et al. | 718/1 |
| 2009/0288167 A1 * | 11/2009 | Freericks et al. | 726/23 |

OTHER PUBLICATIONS

Sailer, R. et al; "Building a MAC-Based Security Architecture for the Xen Open-Source Hypervisor;" Computer Security Application Conference, 21st; Dec. 5, 2005, pp. 276-285.

* cited by examiner

*Primary Examiner* — Nabil El Hady
(74) *Attorney, Agent, or Firm* — Advantedge Law Group

(57) ABSTRACT

A computer-implemented method for controlling access to data is. A request to access data is received. A determination is made that an access-control policy of the data is satisfied. A virtualization layer is activated to allow access to the data after determining that the access-control policy is satisfied. Various other methods, systems, and computer-readable media are also disclosed.

20 Claims, 7 Drawing Sheets

SYSTEMS AND METHODS FOR CONTROLLING ACCESS TO DATA THROUGH APPLICATION VIRTUALIZATION LAYERS

BACKGROUND

The consumerization of Information Technology (IT) includes a trend towards allowing employees control over their computing environment choices. An increasing number of employees may use computing devices, such as laptops and smart phones, to manage both work and personal tasks. The use of such devices may allow these employees to integrate their work lives and personal lives in order to maintain a continual work-life reality. These computing devices often contain sensitive personal and work-related data.

Sensitive data may include financial data, such as credit card numbers, bank account numbers, and various other types of financial data. Sensitive data may also include personal information such as social security numbers, passwords, birthdays, and various other types of personal information. Computing devices may also contain other types of sensitive data, such as confidential intellectual property. Unauthorized access to confidential data may result in financial loss and other undesirable consequences.

Traditional enterprise IT infrastructures may protect sensitive data by strictly controlling the devices used to access the sensitive data. For example, in a traditional network infrastructure, only desktop computers that are directly connected to an office's local area network may be allowed to access confidential data. However, this traditional approach to protecting sensitive data may no longer be feasible due to the consumerization of IT, as described above. What is needed, therefore, is a more robust mechanism for protecting sensitive data.

SUMMARY

As will be described in greater detail below, the instant disclosure generally relates to systems and methods for controlling access to data through virtualization layers. For example, a security module may receive a request to access data. The security module may determine whether an access-control policy associated with the data is satisfied. After determining that the access-control policy is satisfied, the security module may activate a virtualization layer to allow access to the data.

In some embodiments, the security module may determine, based on the state of the computing device, that the access-control policy of the data is satisfied. The computing device may include the virtualization layer. In other embodiments, the security module may determine that the access-control policy of the data is satisfied by determining that a user of the computing device has a right to access the data.

As previously noted, the access-control policy may require that one or more conditions be met before allowing access to the data. The one or more conditions may be, but are not limited to, the following: the computing device is connected to a virtual private network; the computing device is in a predetermined location; the computing device is not connected to an unsecured network; the computing device is not connected to a public network; a security application (e.g., an anti-virus application) is running on the computing device; the security application is up to date; a prohibited application (e.g., a peer-to-peer file-sharing application) is not running on the computing device; and a prohibited application is not installed on the computing device.

In various embodiments, the data may be stored locally on the computing device. In such embodiments, the data may be encrypted, and allowing access to the data may include decrypting the data. In other embodiments, the data may be stored remotely from the computing device, and allowing access to the data through a virtualization layer may include streaming the data from the remote computing device to the local computing device. According to at least one embodiment, the remote computing device may be on a protected network, and determining that the access-control policy of the data is satisfied may include determining that the local computing device is connected to the protected network via a virtual private network connection.

The request to access data may be made for various reasons. In some embodiments, the request to access data may be a request to change a setting of an application. Thus, the data may be a setting of an application. In other embodiments, the request to access data may be a request from an application to access a file or other data. According to various embodiments, the request to access data may include a request to run an application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. The exemplary embodiments described herein are susceptible to various modifications and alternative forms, and are not intended to be limited to the particular forms disclosed. Rather, the instant disclosure covers all modifications, equivalents, and alternatives falling within the scope of the appended claims

DETAILED DESCRIPTION

The instant disclosure generally relates to systems and methods for controlling access to data through virtualization layers. The present systems and methods may provide solutions that allow safe and controlled access to protected data from multi-purpose computing environments, but only when the environments are suitably secured. As discussed in greater detail below, the methods and systems disclosed herein may provide various other features and advantages.

Figure 1:
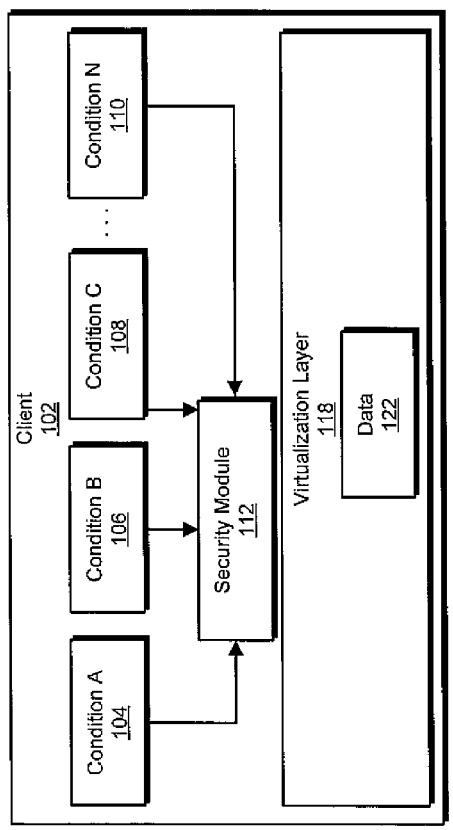
FIG. 1 is a block diagram illustrating embodiments of a client computing device in accordance with the present systems and methods.

FIG. 1 is a block diagram illustrating a client computing device 102. The client computing device 102 may be a personal computer (PC), a laptop computer, a personal digital assistant (PDA), a smart phone, or any other type of computing device. In one configuration, the client computing device 102 may be associated with conditions 104, 106, 108, 110. The conditions 104, 106, 108, 110 may describe various circumstances and/or characteristics associated with the client computing device 102. For example, condition A 104 may describe the geographical location of the client computing device 102. Condition B 106 may describe anti-virus protections currently installed on the client computing device 102. Condition C 108 may describe operating system (OS) and application patches currently installed on the client computing device 102. The client computing device 102 may be associated with any number of conditions that further describe the circumstances and/or characteristics of the device 102.

In one embodiment, the client computing device 102 may also include a security module 112, which may also be referred to as a state analyzer. The security module 112 may analyze the client 102 to determine one or more of conditions 104, 106, 108, 110 of client 102. The security module 112 may also analyze one or more of the conditions 104, 106, 108, 110 to determine whether or not the client computing device 102 satisfies an access-control policy. An access-control policy may be one or more rules that a computing device is required to satisfy before being allowed access to certain data. In one embodiment, the access-control policy may be established by a system administrator, a network administrator, etc.

As an example, the security module 112 may analyze condition A 104 to determine whether or not the client computing device 102 is within a specific geographic location. In addition, the security module 112 may analyze condition B 106 to determine whether or not the client computing device 102 includes certain anti-virus protections. If the security module 112 determines that the device 102 is not within the specific geographic location and/or that the device 102 does not include the certain anti-virus protections, the device 102 may not satisfy the access-control policy. As a result, the device 102 may not be allowed access to the data 122. The data 122 may be encrypted to prevent access by unauthorized users. The data 122 may be stored in a virtualization layer 118.

In one configuration, the virtualization layer 118 may be disabled if the client computing device 102 does not satisfy an access-control policy associated with the data 122. In another configuration, the virtualization layer 118 may be enabled if the client 102 satisfies the access-control policy. When the virtualization layer 118 is activated, the data 122 may be accessible. For example, an application running on the client computing device 102 may be allowed access to the data 122 if the client computing device 102 satisfies the access-control policy. If the client computing device 102 does not satisfy the access-control policy, the virtualization layer 118 may not be activated and data 122 may be inaccessible.

Figure 2:
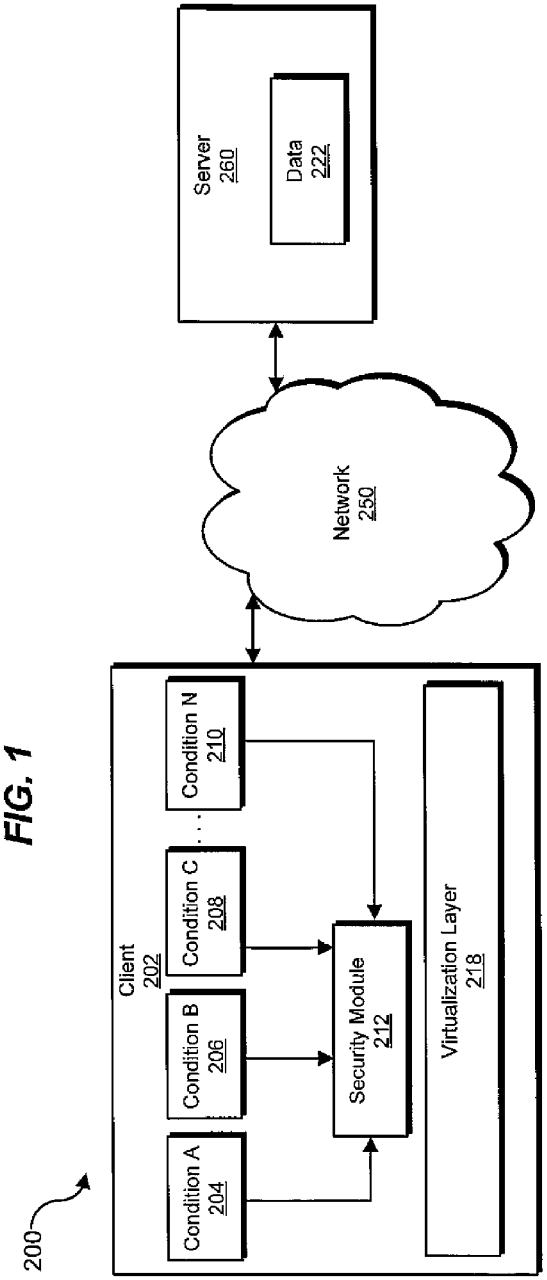
FIG. 2 is a block diagram illustrating embodiments of a client computing device and a server in accordance with the present systems and methods.

FIG. 2 is a block diagram 200 illustrating a client computing device 202 and a server 260. The client 202 and the server 260 may communicate over a network 250. Conditions 204, 206, 208, 210 may be associated with the client 202. A security module 212 may analyze one or more of the conditions 204, 206, 208, 210 to determine whether or not the client 202 satisfies an access-control policy.

In one embodiment, the server 260 stores data 222. An application on client 202 may request access to data 222. If the client 202 satisfies the access-control policy, the virtualization layer 218 may be activated and the application may receive data 222 through virtualization layer 218. Virtualization layer 218, when activated, may stream data 222 to applications on client 202, so that the originating location of the data 222 is transparent to applications on client 202.

As previously described, virtualization layers may control access to the data 222. For example, the virtualization layer 218 may prevent the client 202 from connecting to the network 250 until the client 202 satisfies the access-control policy. As an example, the virtualization layer 218 may be activated, but the client 202 may still not be allowed to connect to the network 250 until the access-control policy is satisfied. In another embodiment, the client 202 may connect to the network 250, but the virtualization layer 118 may prevent the client 202 from accessing the data 222 until the client 202 satisfies the access-control policy. In a further embodiment, the virtualization layer 218 may prevent the data 222 from being streamed from the server 260 to the client 202 until the client 202 satisfies the access-control policy.

A virtualization layer may be created by locating files, registry settings, and any other data in a structure that mirrors a real underlying file system. Such a mirroring system may be organized in a common directory, with one subdirectory per defined layer, each including a mirrored directory structure of the underlying file system.

An exported layer may include all of the layer-included information bundled in a transportable archive. Exported layers may be further bundled into groups, which is especially useful for layers that rely on other layers, such as layers of a hierarchy or pier layers. For systems that utilize a mirrored structure of an underlying file system, it may be beneficial to hide the mirrored structure from unauthorized users, so as to prevent access to confidential data by unauthorized users.

A layer intending to isolate an application, associated data files, and/or settings, may also store the files and directory structure of the application's installation. When that layer becomes enabled (or activated), those application files and directory may be shadowed or overlaid over the regular operating system file system. Shared libraries, system accessible configurations, and version control may be managed by the layering subsystem, optionally using an internal database. Though each layer is a separate and individual entity within the host OS, the application files, associated data, and settings are presented as if they reside in their respective ordinary locations. As such, an application, or any other data, that resides in a layer may appear to the host OS as if it were stored on the computing device in the ordinary fashion.

Figure 3:
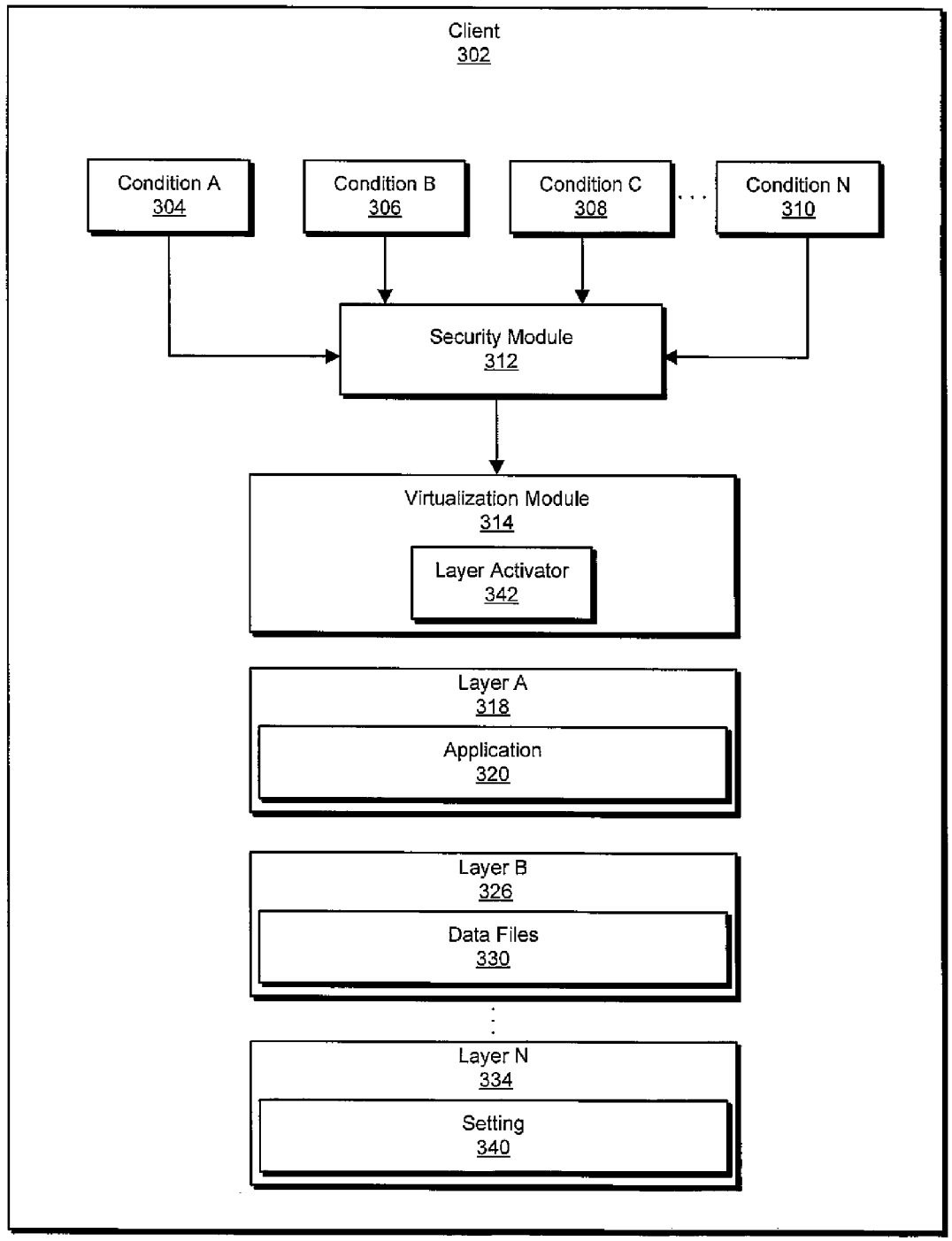
FIG. 3 is a block diagram illustrating further embodiments of a client computing device in accordance with the present systems and methods.

FIG. 3 is a block diagram illustrating a client computing device 302. As described above, the client computing device 302 may include a plurality of conditions 304, 306, 308, 310. The plurality of conditions may be certain attributes or characteristics of the client computing device 302. In one embodiment, the client computing device 302 includes a security module 312. The security module 312 analyzes one or more of the conditions in order to determine whether or not the client computing device 302 satisfies an access-control policy.

The client 302 may also include a virtualization module 314. In some embodiments, the virtualization module 314 may use file system filter drivers to isolate applications, data files, and/or application settings within their own segregated folder hierarchy defined as a layer. In other embodiments, the virtualization module 314 may use any other virtualization technique to control access to data through layer activation and deactivation. Layer activation and deactivation may be implemented using a layer activator 342.

As an example, the condition A 304 may be that a user is logged into the client 302. The user may attempt to start the application 320, which is stored in the layer A 318. The security module 312 may determine whether the user has permission to the start application 320. If the user does not have permission to start the application 320, the security module 312 may not activate the layer 318, thereby preventing the user from accessing (i.e., starting) the application A 320.

In another example, a software program may attempt to access the data files B 330. The data files B 330 may be sensitive financial information, and may be stored on the layer B 326. An access-control policy may state that the software program may only be allowed to access the data files 330 if the conditions B 306 (e.g., no peer-to-peer file-sharing applications are running on client 302) and C 308 (e.g., client 302 is not connected to an unsecured network) are met. If one or both of the conditions B 306 and C 308 are not met, the security module 312 may prevent the software program from accessing the data files 330 by not activating layer B 326. If both the conditions B 306 and C 308 are met, security module 312 may allow the software program to access the data files 330 by activating the layer B 326.

In some embodiments, virtualization layers may be used to control access to settings. For example, a user may attempt to change a setting 340 of an application. However, the user may not have the right to change the setting 340 (e.g., condition N 310 may designate that only particular users may change setting 340), and security module 312 may not enable the layer N 334, thereby preventing the user from changing setting 340. If a user with the right to change setting 340 attempts to change setting 340, security module 312 may activate layer N 334, thereby allowing the user to change setting 340.

Security module 312 may use layer activator 342 to activate and deactivate layers. Layer activator 342 may be any virtualization application capable of activating and/or deactivating layers. Data in a layer may appear to be where the operating system or an application expects them to be when the layer is activated. However, if the layer is deactivated, the data in the layer may not be visible to the operating system and/or other application. The elements of a deactivated layer may be encrypted so as to not be accessible by software on client 302. As illustrated, virtualization layers may control access to data. In addition, the layers in the present systems and methods may also prevent the execution of applications or the changing of settings associated with the applications when an access-control policy is not satisfied.

Figure 4:
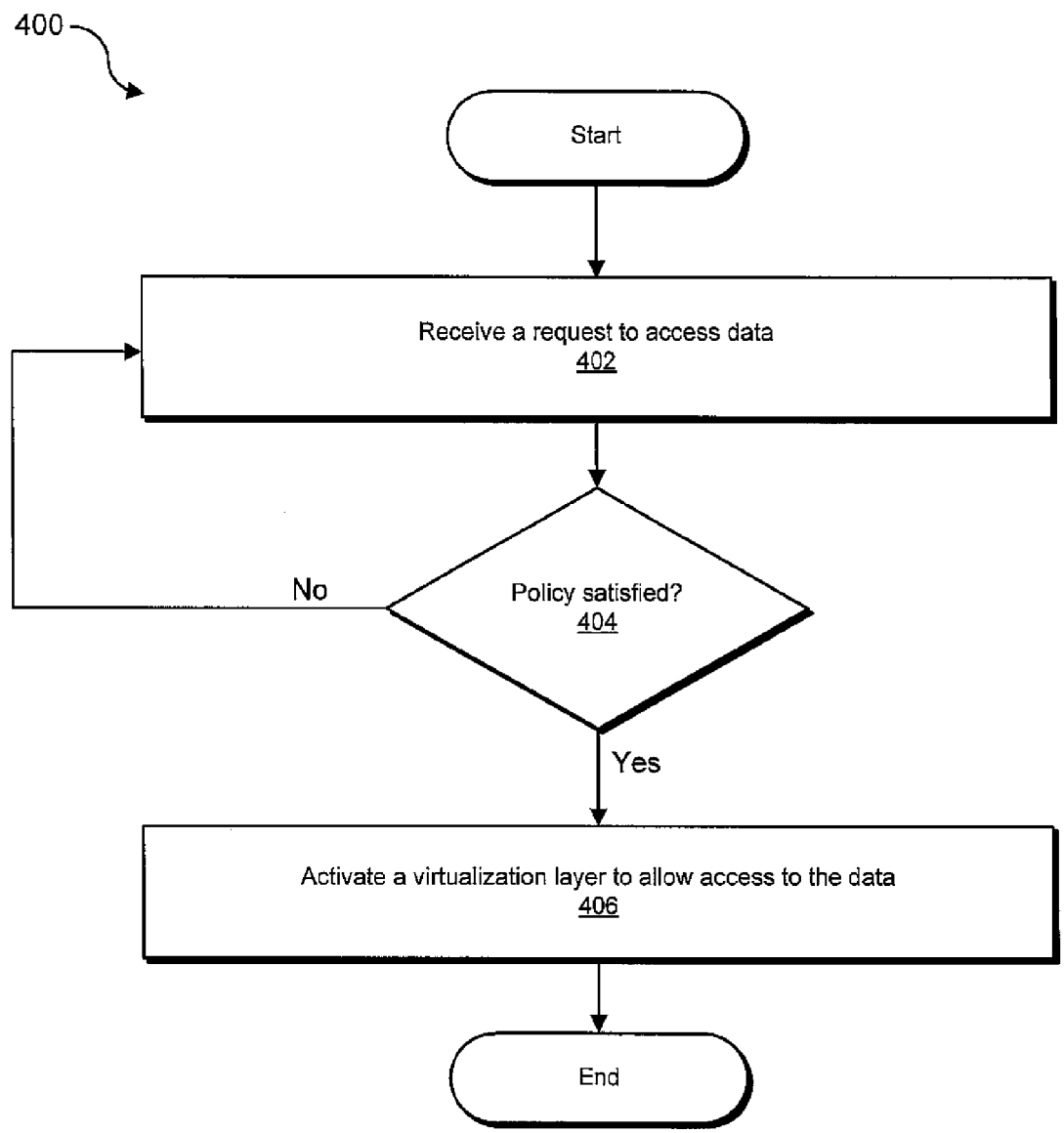
FIG. 4 is a flow diagram illustrating embodiments of a method for controlling access to data through virtualization layers.

FIG. 4 is a flow diagram illustrating a method 400 for controlling access to data through virtualization layers. The method 400 may be implemented by the client computing device 102. In one embodiment, a request to access data may be received 402. The request may include a request to change a setting of an application. In another embodiment, the request may include a request to start an application. The request to access the data may be received from a first application.

A determination 404 may be made as to whether or not an access-control policy is satisfied. If it is determined 404 that the access-control policy is not satisfied, the method 400 continues to receive requests to access data. If it is determined 404 that the access-control policy is satisfied, one or more virtualization layers may be activated 406. A virtualization layer may include the data. In one embodiment, the data may be encrypted. The determination 404 may include detecting a state of the computing device and determining if the state of the computing device satisfies the access-control policy. In another embodiment, the determination 404 may include determining that a user of the computing device has a right to access the data. In a further embodiment, the determination 404 may include determining whether or not the first application has a right to access the data.

In one embodiment, the access-policy may specify, for example, that the computing device includes active data leakage protection (DLP) agents, up to date anti-malware solutions, up to date operating system (OS) and application patches, active virtual private network (VPN) connections, no running/active (or, alternatively, installed) applications that are prohibited (e.g. P2P sharing applications), no connections to a public/unsecured WiFi network, etc. The access-control policy may further specify that the computing device be within an acceptable, predetermined geographical location. For example, the policy may require that the computing device be within the United States or within a corporation's office. The location of the computing device may be determined through geo-location or a global positioning system (GPS).

As described above, a virtualization layer may store several elements. These elements may be an application, associated data files, and associated settings. Once the virtualization layer is activated 806, the computing device may be allowed access to the data. In one embodiment, allowing access to the data includes decrypting the data. In another embodiment, allowing access to the data includes allowing the first application to access the data.

Figure 5:
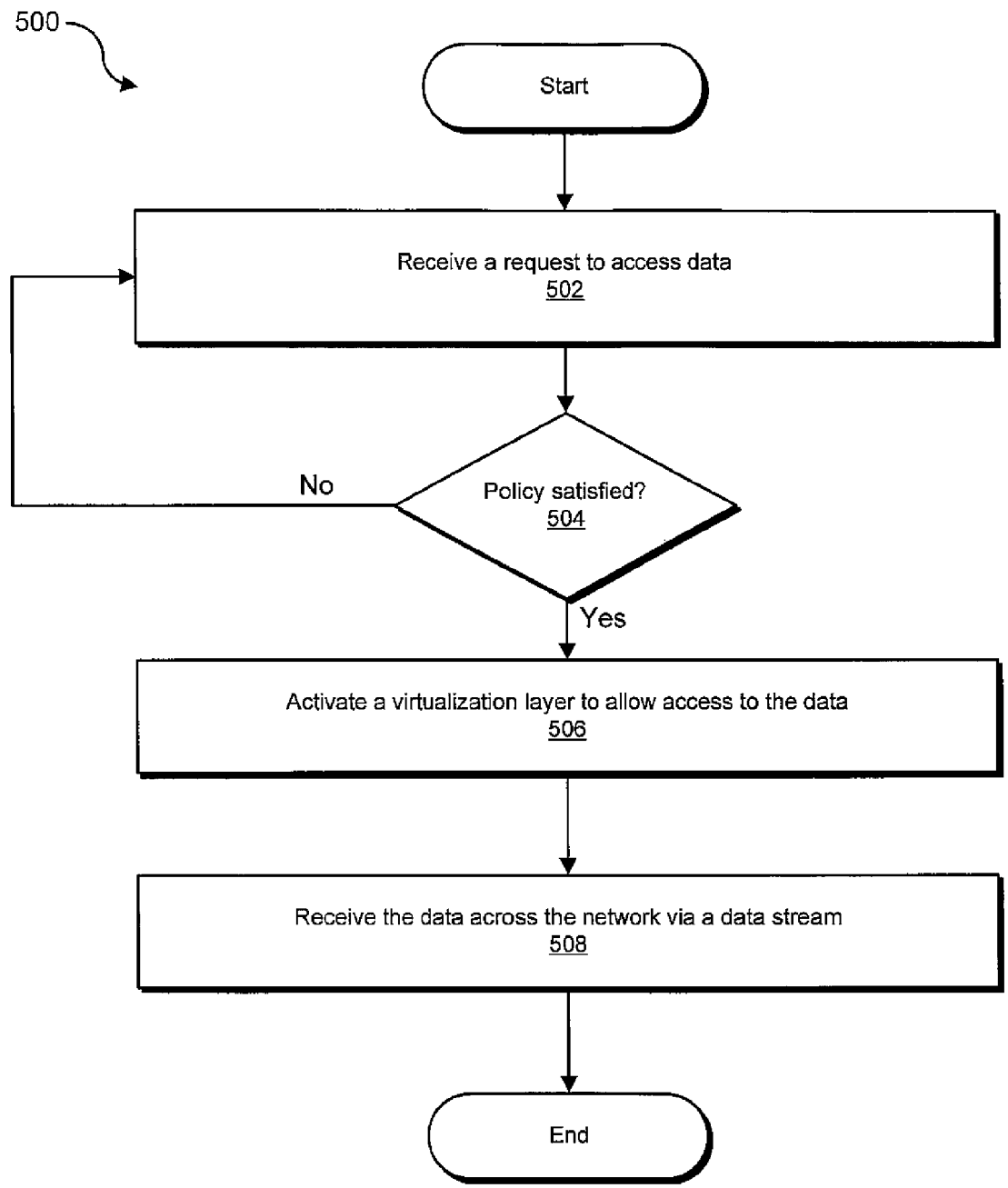
FIG. 5 is a flow diagram illustrating embodiments of a method for controlling access to data through virtualization layers that may be stored at a location that is remote to a computing device.

FIG. 5 is a flow diagram illustrating a method 500 for controlling access to data through virtualization layers when the data is stored in a remote location. The method 500 may be implemented by a client computing device 102. In one embodiment, a request to access data may be received 502. A determination 504 may be made as to whether or not the client computing device 102 satisfies an access-control policy. If the policy is not satisfied, the method 500 may return to continue receiving 502 receiving requests to access data. However, if the policy is satisfied, a virtualization layer may be activated 506 to allow access to the data.

In one embodiment, a secure connection between the computing device and a remote device that stores the data may be established over a network. The network may allow for communications between the device and the remote device (e.g. a server). The remote device may be on a protected network. In one embodiment, determining 504 whether or not the computing device satisfies the access-control policy may include determining if the computing device is connected to the protected network via a secured connection. According to some embodiments, the secured connection is a virtual private network connection.

The remote device may store data associated with the virtualization layer as previously described. When the virtualization layer is activated 506, the data stored in the remote device may be accessible. In one embodiment, the data is received by the device 508 across the network via a data stream.

Figure 6:
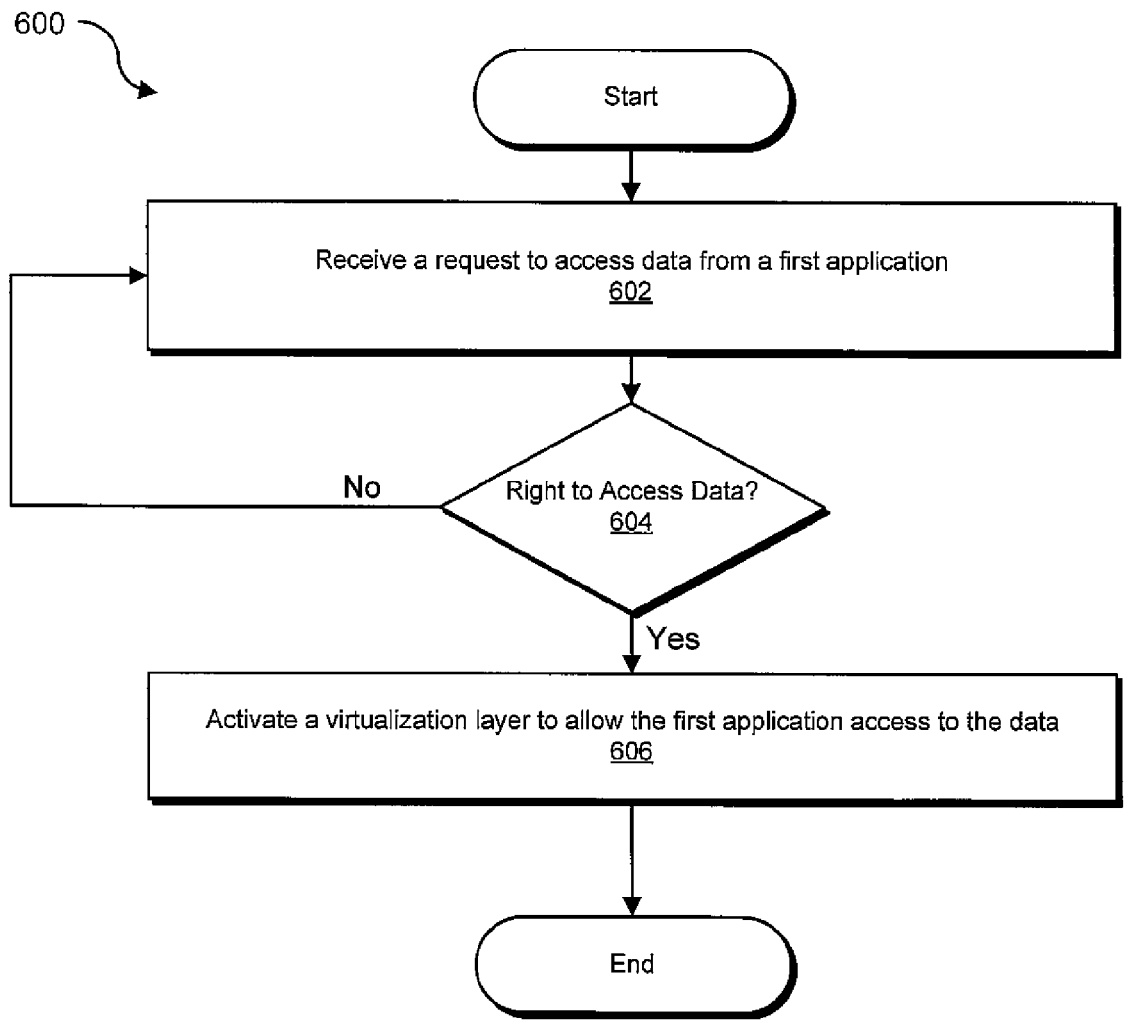
FIG. 6 is a flow diagram illustrating embodiments of a method for controlling access to data for a specific application.

FIG. 6 is a flow diagram illustrating a method 600 for controlling an application's access to data. In one embodiment, the method 600 is implemented by the client computing device 102. A request to access data may be received 602 from a first application. A virtualization layer may include the data and the data may be encrypted. A determination 604 may be made as to whether or not the first application has a right to access the data. If it is determined 604 that the first application does not have a right to access the data, the method 600 may return to receive other requests to access data from the first application. If the policy is satisfied, a virtualization layer may be activated 606 to allow the first application access to the data. Allowing the first application access to the data may include decrypting the data. In addition, allowing the first application access to the data may include streaming the data from remote computing device to the first application.

In one embodiment, the determination 604 may include detecting a state of the computing device on which the first application is running and determining whether the state of the computing device satisfies an access-control policy for the data. In another embodiment, the determination 604 may include determining whether the access-control policy indicates that the first application is authorized to access the data. In a further embodiment, the determination 604 may include determining whether a user of the first computing device has a right to access the data.

Figure 7:
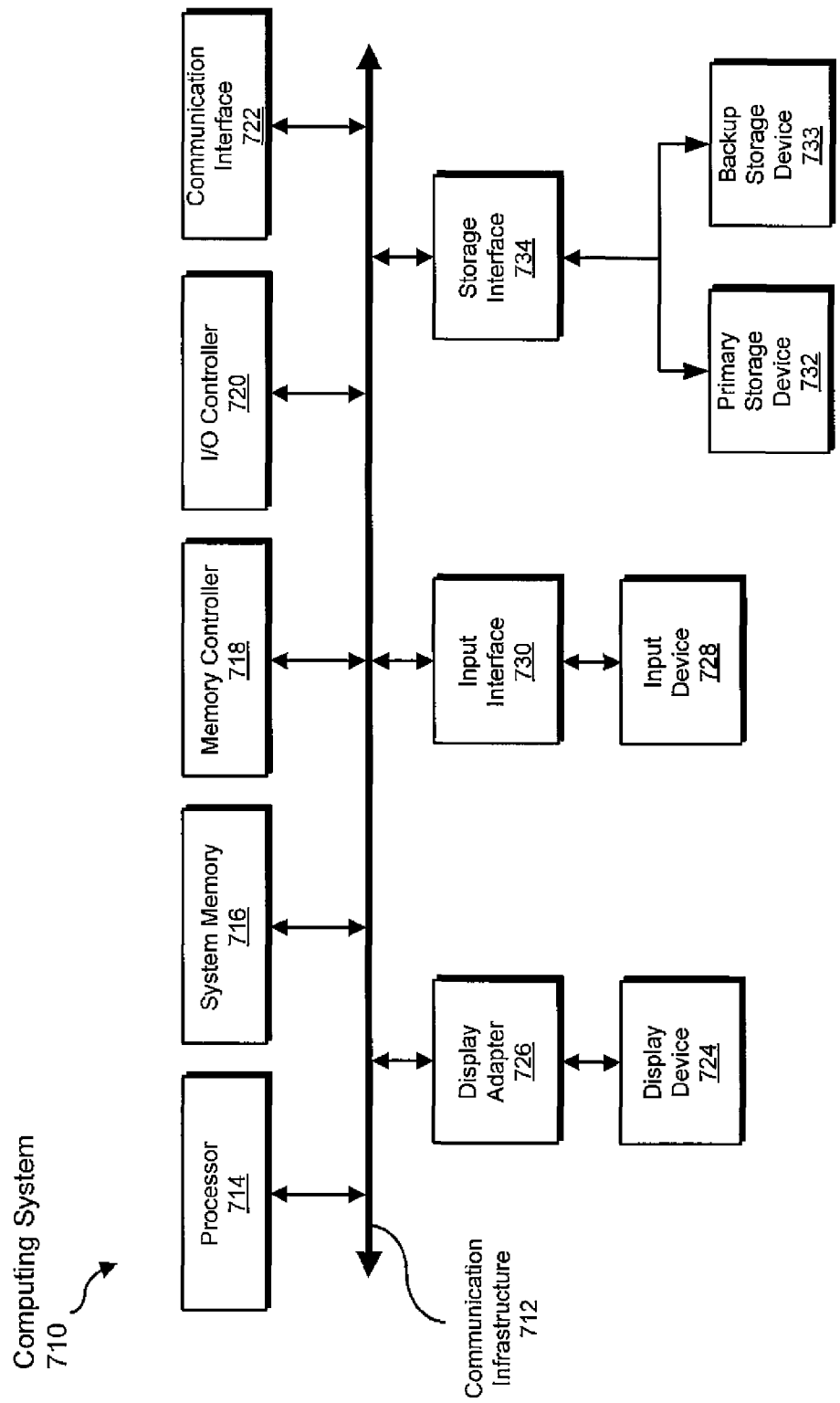
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, activating, detecting, and/or allowing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, determining, activating, detecting, and/or allowing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for the receiving, determining, activating, detecting, and/or allowing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, activating, detecting, and/or allowing steps disclosed herein. Communication interface 722 may also be used to perform and/or be a means for performing other steps and features set forth in the instant disclosure.

As illustrated in FIG. 11, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, activating, detecting, and/or allowing steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the receiving, determining, activating, detecting, and/or allowing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
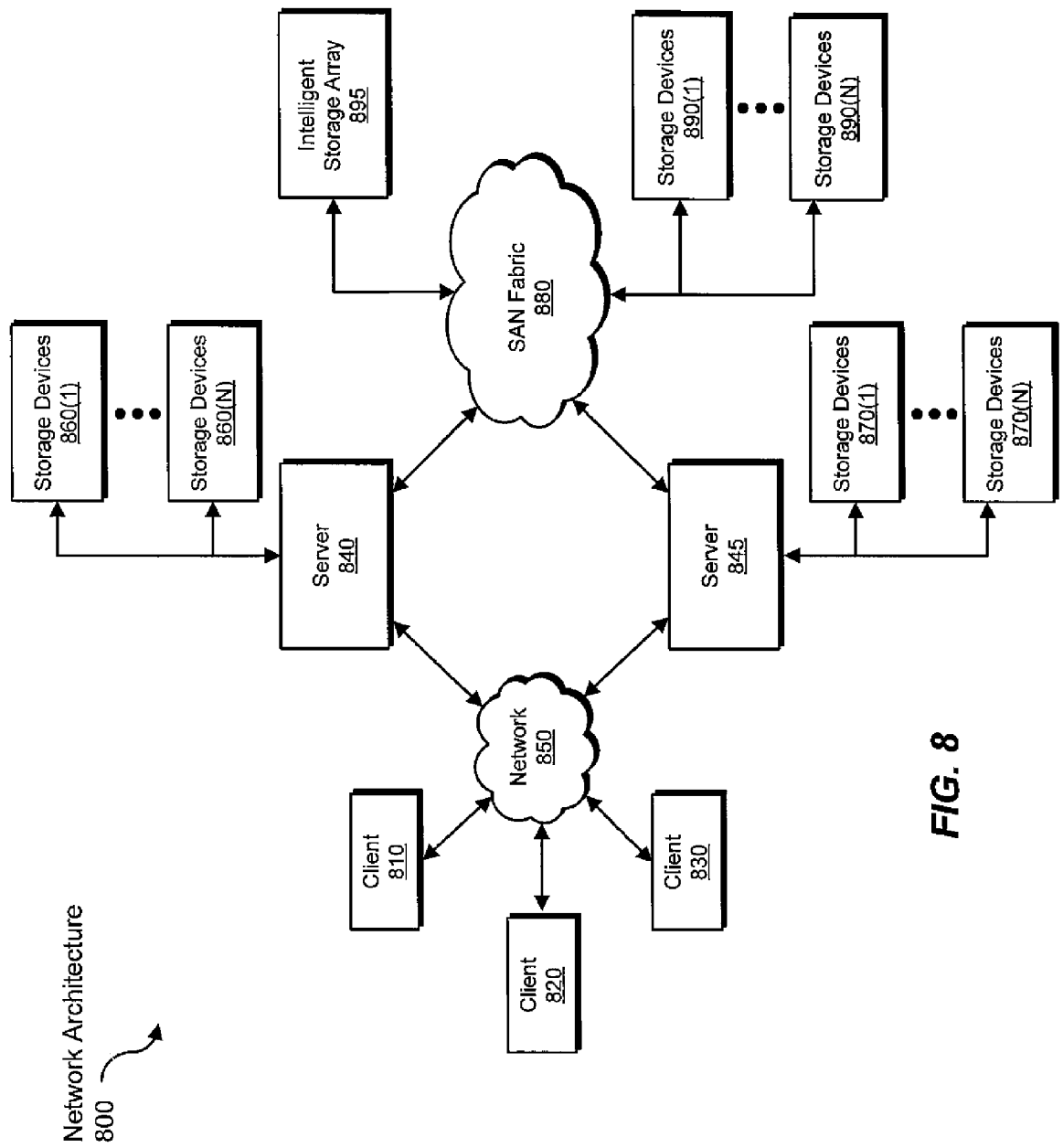
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, activating, detecting, and/or allowing steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for controlling access to data that may comprise: 1) receiving a request to access data, 2) determining that an access-control policy of the data is satisfied, and then 3) activating a virtualization layer to allow access to the data after determining that the access-control policy is satisfied.

In one example, determining that the access-control policy of the data is satisfied comprises 1) detecting a state of a computing device, the computing device comprising the virtualization layer, and then 2) determining that the state of the computing device satisfies the access-control policy.

In another embodiment, the access-control policy requires at least one of the following conditions to be met before access to the data is allowed: 1) a first computing device is connected to a virtual private network, 2) the first computing device is in a predetermined location, 3) a security application is running on the computing device, 4) the security application is up to date, 5) a prohibited application is not running on the computing device, 6) the prohibited application is not installed on the computing device, 7) the first computing device is not connected to an unsecured network, and 9) the first computing device is not connected to a public network.

In one example, the virtualization layer may comprise the data, the data may be encrypted, and allowing access to the data may comprise decrypting the data. In one embodiment, allowing access to the data comprises streaming the data from a remote computing device to a local computing device. The local computing device may comprise the virtualization layer. In one configuration, the remote computing device may be on a protected network. In another embodiment, determining that an access-control policy of the data is satisfied may comprise determining that a first computing device is connected to the protected network via a virtual private network connection. In a further embodiment, determining that an access-control policy of the data is satisfied may comprise determining that a user of a first computing device has a right to access the data.

In one embodiment, the request to access data may comprise a request to change a setting of an application. In addition, the request may comprise a request to start an application. In a further configuration, a request to access data may be received from a first application. A determination may be made that an access-control policy of the data is satisfied by determining that the first application has a right to access the data. A virtualization layer may be activated to allow the first application to access the data.

Computing system 710 and/or one or more of the components of network architecture 800 may also perform and/or be a means for controlling access to data by: 1) receiving a request to access data, the request being received from a first application, 2) determining that the first application has a right to access the data, and then 3) activating a virtualization layer to allow the first application access to the data.

In one example, determining that the first application has a right to access the data comprises: 1) detecting the state of a computing device on which the first application is running, and 2) determining that the state of the computing device satisfies an access-control policy for the data.

In another embodiment, the access-control policy requires at least one of the following conditions to be met before the first application is allowed access to the data: 1) a first computing device is connected to a virtual private network, 2) the first computing device is in a predetermined location, 3) a security application is running on the computing device, 4) the security application is up to date, 5) a prohibited application is not running on the computing device, 6) the prohibited application is not installed on the computing device, 7) the first computing device is not connected to an unsecured network, and 8) the first computing device is not connected to a public network.

In one configuration, determining that the first application has a right to access the data may comprise determining that an access-control policy indicates that the first application is authorized to access the data. In one embodiment, the virtualization layer may comprise the data. The data may be encrypted and allowing the first application access to the data may comprise decrypting the data.

In one embodiment, allowing the first application to access the data may comprise streaming the data from a remote computing device to the first application. In a further embodiment, determining that the first application has a right to access the data may comprise determining that a user of a first computing device has a right to access the data.

Computing system 710 and/or one or more of the components of network architecture 800 may perform and/or be a means for performing a computer-implemented method for controlling access to data for one or more applications, which method comprises: 1) receiving a request to access data, 2) determining that an access-control policy of the data is satisfied, and then 3) activating a virtualization layer to allow access to the data after determining that the access-control policy is satisfied.

In one embodiment, determining that the access-control policy of the data is satisfied may comprise: 1) code for detecting a state of a computing device, and 2) code for determining that the state of the computing device satisfies the access-control policy. In one example, the computing device may comprise the virtualization layer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of". In addition, for ease of use, the words "including" and "having," as used in the specification and claims, are interchangeable with and have the same meaning as the word "comprising."

What is claimed is:

1. A computer-implemented method for controlling access to data, at least a portion of the method being performed by a computing system comprising at least one processor, the computer-implemented method comprising:
    receiving a request to access data stored in a deactivated virtualization layer that mirrors a directory structure of an underlying file system;
    identifying an access-control policy that requires at least one condition to be met by a computing device before access to the data stored in the deactivated virtualization layer is allowed;
    analyzing the computing device to determine whether the condition required by the access-control policy has been met by the computing device;
    determining, based on the analysis of the computing device, that the access-control policy is satisfied;
    activating the virtualization layer to allow access to the data in response to the determination that the access-control policy is satisfied.

2. The computer-implemented method of claim 1, wherein determining that the access-control policy is satisfied comprises:
    detecting the state of a computing device, the computing device comprising the virtualization layer;
    determining that the state of the computing device satisfies the access-control policy.

3. The computer-implemented method of claim 2, wherein:
    the access-control policy requires at least one of the following conditions to be met before access to the data is allowed:
        the computing device is connected to a virtual private network;
        the computing device is in a predetermined location;
        a security application is running on the computing device;
        the security application is up to date;
        a prohibited application is not running on the computing device;
        the prohibited application is not installed on the computing device;
        the computing device is not connected to an unsecured network;
        the computing device is not connected to a public network.

4. The computer-implemented method of claim 1, wherein:
    the data is encrypted;
    allowing access to the data comprises decrypting the data.

5. The method of claim 1, wherein:
    the computing device comprises a local computing device;
    allowing access to the data comprises streaming the data from a remote computing device to the local computing device.

6. The method of claim 5, wherein:
    the remote computing device is on a protected network;
    determining that an access-control policy is satisfied comprises determining that the local computing device is connected to the protected network via a virtual private network connection.

7. The computer-implemented method of claim 1, wherein:
    the computing device comprises the virtualization layer;

determining that an access-control policy is satisfied comprises determining that a user of the computing device has a right to access the data stored in the virtualization layer.

8. The computer-implemented method of claim 1, wherein:
the request to access data comprises a request to change a setting of an application.

9. The computer-implemented method of claim 1, wherein:
the request to access data is received from a first application;
determining that an access-control policy of the data is satisfied comprises determining that the first application has a right to access the data;
activating a virtualization layer to allow access to the data comprises allowing the first application to access the data.

10. The computer-implemented method of claim 1, wherein:
the request to access data comprises a request to start an application.

11. The computer-implemented method of claim 1, wherein receiving the request to access data stored in the deactivated virtualization layer comprises receiving a request from a software program installed on a host operating system to access data stored in a deactivated virtualization layer that mirrors a directory structure of an underlying file system of the host operating system.

12. The computer-implemented method of claim 1, wherein activating the virtualization layer comprises overlaying the virtualization layer over the underlying file system, the underlying file system comprising a regular file system of a host operating system.

13. The computer-implemented method of claim 1, wherein the virtualization layer is an individual entity within a host operating system installed on the computing device.

14. A computer-implemented method for controlling access to data, at least a portion of the method being performed by a computing device comprising at least one processor, the computer-implemented method comprising:
receiving a request from a first application to access data stored in a deactivated virtualization layer that minors a directory structure of an underlying file system;
identifying an access-control policy that indicates whether the first application has a right to access the data stored in the deactivated virtualization layer;
determining that the first application has a right to access the data stored in the deactivated virtualization layer;
activating the virtualization layer to allow the first application access to the data stored in the virtualization layer.

15. The computer-implemented method of claim 14, wherein determining that the first application has a right to access the data comprises:
detecting a state of a computing device on which the first application is running;
determining that the state of the computing device satisfies an access-control policy for the data.

16. The computer-implemented method of claim 14, wherein determining that the first application has a right to access the data comprises:
determining that an access-control policy indicates that the first application is authorized to access the data.

17. The computer-implemented method of claim 14, wherein:
the data is encrypted;
allowing the first application access to the data comprises decrypting the data.

18. The method of claim 14, wherein:
allowing the first application to access the data comprises streaming the data from a remote computing device to the first application.

19. The computer-implemented method of claim 14, wherein:
a computing device comprises the virtualization layer;
determining that the first application has a right to access the data comprises determining that a user of the computing device has a right to access the data.

20. A computer-program product for controlling access to data, the computer-program product comprising a non-transitory computer-readable storage medium having instructions thereon, the instructions comprising:
code programmed to receive a request to access data stored in a deactivated virtualization layer that mirrors a directory structure of an underlying file system;
code programmed to identify an access-control policy that requires at least one condition to be met by a computing device before access to the data stored in the deactivated virtualization layer is allowed;
code programmed to analyze the computing device to determine whether the condition required by the access-control policy has been met by the computing device;
code programmed to determine, based on the analysis of the computing device, that the access-control policy is satisfied;
code programmed to activate the virtualization layer to allow access to the data in response to the determination that the access-control policy is satisfied.

* * * * *